Sept. 28, 1943.  E. UFFELMANN  2,330,643
LINING FOR ROPE-AND DRIVING PULLEYS
Filed April 7, 1941   2 Sheets-Sheet 1
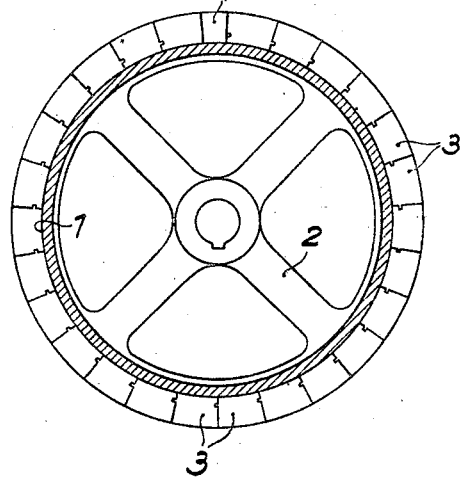
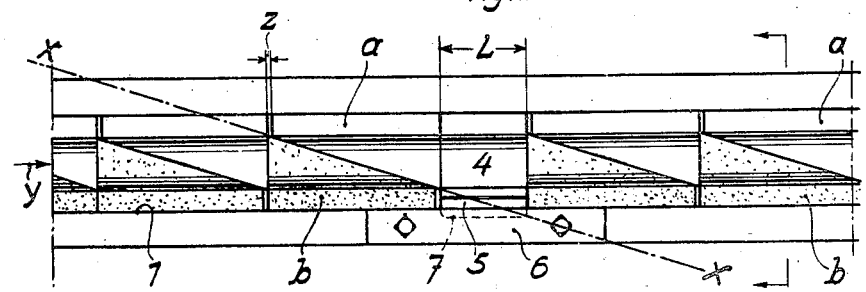
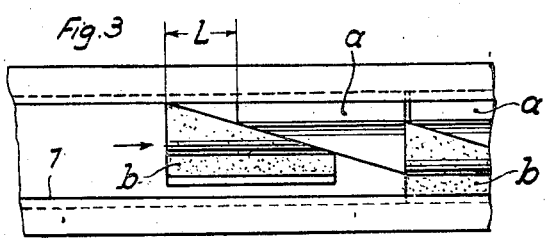
Inventor:
Emil Uffelmann
by Bernard Wohlfiat
Attorney Sept. 28, 1943.  E. UFFELMANN  2,330,643
LINING FOR ROPE-AND DRIVING PULLEYS
Filed April 7, 1941  2 Sheets-Sheet 2
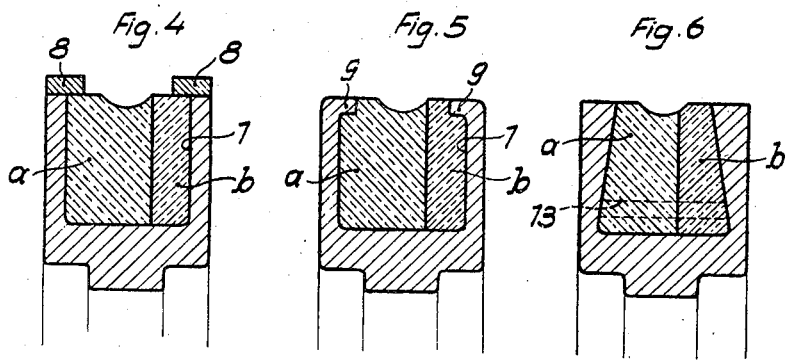
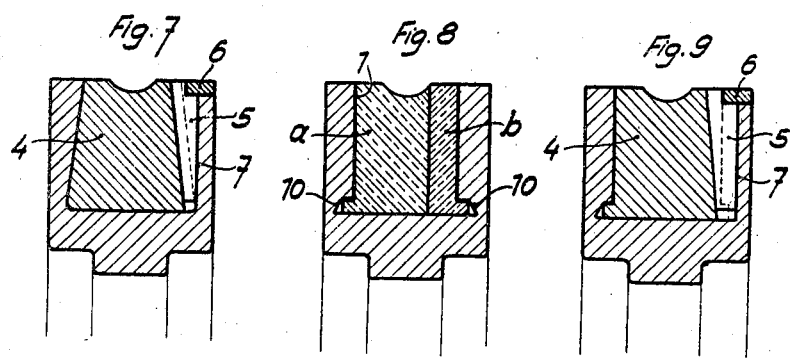
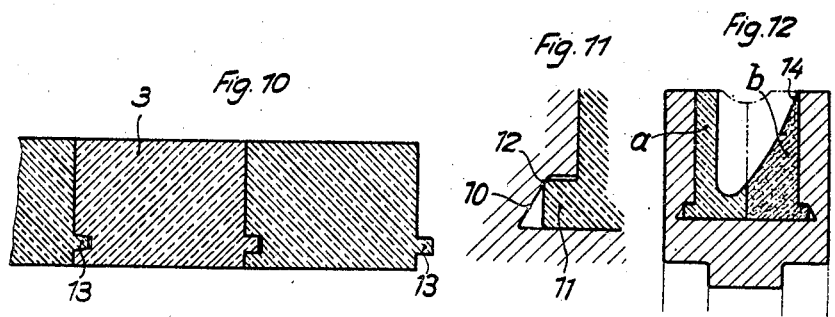
Inventor:
Emil Uffelmann
by Bernard Wohlfert
Attorney Patented Sept. 28, 1943

2,330,643

UNITED STATES PATENT OFFICE 2,330,643

LINING FOR ROPE AND DRIVING PULLEYS

Emil Uffelmann, Hamm, Germany; vested in the Alien Property Custodian

Application April 7, 1941, Serial No. 387,323
In Germany March 6, 1940

4 Claims. (Cl. 74—230.5)

The invention relates to a lining for rope- and driving pulleys, especially for driving pulleys of hoisting machines for mines of that type, in which the lining consists of a row of blocks mounted the one behind the other in the circumferential direction of the pulley. Linings are known, in which these blocks consist of plates of fabric, rubber, leather, cotton or even of light metal, especially aluminium or aluminium alloys. The special difficulty in all these pulleys consists therein, to clamp in the pulley the lining blocks, which mostly have only small dimensions, for instance 50 to 60 mm. in the circumferential direction, so that they can neither wander in the circumferential direction nor be thrown out in radial direction by the effect of the centrifugal force. Even if the lining at the building-in sits fast, such a loosening mostly occurs, however, after slight wear, so that by the centrifugal force effect or by the action of the rope itself parts of the lining are thrown out.

In a known lining of this type for driving pulleys, the clamping of the lining blocks is effected by laterally arranged wedges which form a wedge ring, each segment having to be tightened by screws. This construction possesses the inconvenience, that the thickness of the pulley is great and consequently the weight of the same increased. When lining blocks are used which are inserted into an undercut groove of the driving pulley or rope pulley, it is necessary to widen the groove at least at one point of the pulley to form a pocket, to make possible the inserting of the lining blocks. This pocket measured in its circumferential direction must correspond at least to the length of the lining blocks. The inserting of the lining blocks from this pocket is difficult and complicated, especially if accurately fitting blocks or pressed seating has to be employed. One block after the other must then be driven-in by difficult work in the circumferential direction by means of blows of a hammer for overcoming the strong friction on the walls of the groove. This work is particularly difficult, if it has to take place without removing of the rope, for instance when a worn lining has to be replaced by a fresh lining.

For the clamping of blocks it is well known, to insert wedges at one or several points of the circumference of the pulley.

According to the invention these inconveniences are avoided in that the blocks are subdivided at least by a cutting plane extending at an acute angle to the circumferential direction. It is practical, if the subdivision is made only in two parts that these parts are absolutely similar. The angle formed by the cutting plane relative to the circumferential direction may be selected differently. It is best that subdivision is made so that the greatest width of the block parts be equal or slightly smaller than the smallest width of the groove in the disc.

The inserting of the blocks according to the invention into an undercut groove is effected in such a manner that first one half of the first block is inserted up to a predetermined point of the pulley, for instance against a previously inserted end block. The other half of this first block is then inserted and by a hammer blow driven-in onto the wedge-shaped cutting plane. A solid clamping relative to the side walls of the groove is thereby attained. Additional clamping wedges or the like are no longer required. In practice the dimensions of the width of the block parts will preferably be selected so that in the clamped state a slight possibility of tightening still remains. As soon as the pulley is used, a further automatic re-clamping takes place by the effect of the rope. In this manner an absolutely fixed seat of the lining blocks in the groove is attained. The pocket necessary for the inserting need not be of the same length as the blocks, as was necessary up to the present, but it is possible to make the blocks longer, for instance twice or three times as long as the pocket. When all blocks have been inserted, the pocket is filled by an end block. This end block need not be wedge-shaped. Any differences in the circumferential length can be equalized by inserting one or several fitted blocks made of the same material as the lining.

An advantage of the invention consists in that it is no longer necessary to provide a pocket which is wider than the groove in the driving pulley, as owing to the subdivision of the lining blocks the inserting is possible also without such a widening. The small gap which finally remains in the circumferential direction is then filled by an end piece with interposition of a lateral wedge. The wedge can then be secured against flying out in radial direction in known manner by an overlapping plate or ledge which is fixed on the driving pulley. Such ledges are to be mounted on the whole circumference of the pulley, if the invention is to be applied to such constructions, in which the groove in the driving pulley is not undercut.

For a further improvement the invention originated from the known idea of making the parts of the blocks of materials of different hardness and friction when the blocks are subdivided. In a known driving pulley of this type the lining proper is arranged in wooden frame segments. The lining consists then of two parts with cutting plane extending accurately in circumferential direction, the arrangement being selected so that the block halves with the greater friction are arranged alternately on the one and on the other side of each segment frame. Compared herewith the invention proposes, to arrange the block parts consisting of a material of greater hardness all on one side of the pulley, that is on the side of the rope deflection. Thereby wear is strongly reduced just on the side of the rope deflection and displaced to the other side, so that running on of the rope on the metallic rim of the pulley is prevented. This construction can be carried out only, if the kind of subdivision is provided according to the invention, i. e. with cutting plane extending obliquely to the circumferential direction, because, when the cutting plane extends in circumferential direction, the rope would practically run only on the block halves of little hardness, whereas according to the invention also the block halves possessing greater hardness are utilized in sufficient measure.

Another improvement results, if the block parts lying the one behind the other in the circumferential direction are mortised the one with the other by tongue and groove situated near the bottom of the driving pulley. In this manner the flying out of lining blocks is avoided which otherwise may occur on strong wear, particularly on one-sided wear. This measure is especially important for dovetail-shaped blocks. A practical embodiment of the invention is obtained if the block parts near the bottom of the driving pulley have a laterally projecting ledge extending in circumferential direction and engaging in a tapered recess of the driving pulley, so that the edge of the ledge is pressed against the wedge face of the recess. In this manner upsetting of the material of the lining takes place on this wedge face at the driving-in of the blocks, the material of the lining being partly pressed into the wedge-shaped hollow space of the recess. In this manner the clamping of the blocks in the groove of the driving pulley is further improved.

The idea of the invention can be applied on lining blocks of any material, that is on elastic blocks as well as on rigid blocks. This idea is especially material for blocks of metal, preferably light metal such as aluminium and aluminium alloys. For blocks of yieldable material such as fabric or rubber, it is advisable to equip the block parts in the separating plane, which means on the sliding face, with a reinforcement of a material of little friction, especially metal. This reinforcement is required only for the halves of the block parts which at the driving-in come first into touch the one with the other.

By the lining according to the invention it is further obtained that, when the groove in the driving pulley is undercut, a recess of the length of the gap remaining after all blocks have been inserted need be provided only in one side wall of the pulley, this recess being adapted to take up a wedge or a fitted block for securing in position the end piece inserted into the gap. The production of the pulley is thereby considerably simplified.

An embodiment of the invention is illustrated by way of example in the accompanying drawings, in which Fig. 1 shows diagrammatically a driving pulley with lining, Fig. 2 in top plan view the disc crown with built-in lining, Fig. 3 shows how the lining is inserted, Figs. 4 to 6 and 8 cross-sections through the lining with pulley-grooves of different kinds, Figs. 7 and 9 cross-sections corresponding to Figs. 6 and 8, however at the point at which the end piece is to be inserted, Figs. 10 and 11 details in cross-section, and Fig. 12 the wearing proceeding of the lining on a pulley with obliquely engaging rope or rope deflection.

As shown in Fig. 1, a number of lining blocks 3 are inserted in a groove 1 of a pulley 2. The lining is securely held in its position by an end piece 4, the circumferential length of which is shorter than that of the other lining blocks. As can be seen from Fig. 2 and the following figures, each of the lining blocks 3 consists of at least two parts $a$ and $b$. The subdividing plane of these block parts $a$ and $b$ is situated in an acute angle relative to the circumferential direction $y$ of the groove 1 of the pulley, so that these parts $a$ and $b$ are jammed or clamped in the groove 1 when they are pushed the one against the other. The total width of both block parts is preferably slightly greater than the width of the groove. Herefrom results the possibility, that the block halves, when the pulley operates, are still more strongly pulled the one against the other approximately by the measure $z$ by the pull of the rope and can be jammed. The blocks 3 can be inserted, as shown in Fig. 3, without difficulty at any desired point of the circumference of the pulley. The block part $a$ is first inserted and brought to bear against the wall of the groove. The block part $b$ is then inserted into the groove from above and pushed against the block part $a$ and driven-in by a blow of a hammer. The inserting of the next following blocks is effected in similar manner. There remains finally a gap of approximately the length L, which is necessary for the inserting of the last block part $b$. The length of this gap changes with the selection of the angle of the cutting plane $x$—$x$ relative to the circumferential direction $y$. This length of the gap is, however, in most instances considerably shorter than the length of the blocks 3. The gap is filled by the end piece 4. This end piece is preferably made in one part and of a width approximately equal to or smaller than the smallest groove-width of the pulley at this point. The lateral gap which still remains after the end piece has been inserted is filled by a wedge or fitted block 5, whereby dropping out of the end piece is avoided, which on one side is securely held in the undercut pulley groove. The fitted block or wedge 5 is secured against dropping out by a short ledge 6 fixed by screws on the rim of the pulley. In order to avoid overlapping of the safety ledge 6 into the lining, a recess 7 of the length of the end piece is provided on the rim on one side wall of the groove, and the end piece is of such width that the wedge or the fitted block 5 fills wholly or partly this recess 7.

The Figures 4 to 7 show the building-in of the lining in pulleys of known type. The pulley shown in Fig. 4 has a groove of rectangular cross-section. The end piece can then be of the full width of the groove in the pulley. The whole lining is secured against flying out by ledges 8 engaging over the groove edge on the whole circumference and fixed on the rim. According to Fig. 5, the groove 1 in the pulley, which as such is rectangular, has inwardly projecting ledge-like edges 9. Consequently, the lining blocks have corresponding recesses in the sides. In Figs. 6 and 7, the groove is undercut dovetail-like. In the embodiments shown in Figs. 5 to 7 a lateral wedge or fitted block 5 is again necessary for the end piece 4, as shown in Fig. 7.

In the forms of construction shown in Figs. 8, 9, 11 and 12, the groove 1 in the pulley, which as such is rectangular, has lateral recesses 10 on the bottom, which recesses are wedge-shaped towards the outer side. Ledges 11, for instance of rectangular cross-section, of the blocks 3 or of the end piece 4 engage into these recesses. The edge 12 of this ledge presses, at the inserting of the blocks, against the oblique faces of the recesses 10 in being deformed, so that the blocks are seated rigidly clamped in the groove of the pulley also in radial direction. The lining blocks have preferably near the bottom of the pulley a tongue and groove 13, similar as shown in Figs. 6 and 10. Hereby is prevented, that at excessive wearing of the lining block parts are detached and flung out. The block parts $a$ and $b$ may be made of material of different hardness and of different friction. According to Fig. 1, the block parts $a$ are the softer parts and the block parts $b$ the harder parts. The harder block parts are arranged always on the same side of the pulley, that is on the side of the rope deflection. By the special shape of the block parts the material of both block parts is also distributed over the whole width of the groove. Hereby it is prevented that the lining becomes worn out too rapidly, i. e. the lining is utilized approximately on the whole depth, similarly as shown in Fig. 12. If the material for both block parts were similar, the lining would be worn in the depth at 14 after a short use so that it ought to be exchanged or the pulley edge would be damaged.

I claim:

1. Lining for driving pulleys consisting of blocks placed one behind the other and clamped in the circumferential direction of the pulley, in which each block is subdivided at least along a cutting plane extending at an acute angle to the circumferential direction of the pulley, and in which the block parts consist in known manner of materials of different hardness and friction, the block halves of a material possessing greater hardness being all arranged on that side of the pulley on which the rope deflection takes place.

2. A drive pulley with grooved rim and diagonally subdivided lining blocks circumferentially disposed in the groove and secured therein, said lining blocks being of metal and of a width somewhat greater than the width of the groove when adjacent ends of their subdivisions lie in the same planes, whereby when the blocks are in operative position in the groove lateral joint gaps are formed between halves of consecutive blocks, all said blocks being operative drive blocks, the lining blocks being secured in the pulley groove by means including an end block closing the gap between the first and the last inserted lining block, and a member for holding the end block in said groove, said member engaging a recess in a side wall of the groove.

3. A drive pulley with grooved rim and diagonally subdivided lining blocks circumferentially disposed in the groove and secured therein, said lining blocks being of metal and of a width somewhat greater than the width of the groove when adjacent ends of their subdivisions lie in the same planes, whereby when the blocks are in operative position in the groove lateral joint gaps are formed between halves of consecutive blocks, all said blocks being operative drive blocks, the lining blocks being secured in the pulley groove by means including an end block closing the gap between the first and the last inserted lining block, and a wedge for holding the end block in said groove, said wedge engaging a recess in a side wall of the groove.

4. A drive pulley with grooved rim and diagonally subdivided lining blocks circumferentially disposed in the groove and secured therein, said lining blocks being of metal and of a width somewhat greater than the width of the groove when adjacent ends of their subdivisions lie in the same planes, whereby when the blocks are in operative position in the groove lateral joint gaps are formed between halves of consecutive blocks, all said blocks being operative drive blocks, the lining blocks being secured in the pulley groove by means including an end block closing the gap between the first and the last inserted lining block, and a wedge of similar material to that of the lining blocks for holding the end block in said groove, said wedge engaging a recess in a side wall of the groove.

EMIL UFFELMANN.